US012548060B2

(12) United States Patent
Raviv et al.

(10) Patent No.: US 12,548,060 B2
(45) Date of Patent: *Feb. 10, 2026

(54) SYSTEMS AND METHODS FOR RECOMMENDATION GENERATION

(71) Applicant: Yahoo Ad Tech LLC, New York, NY (US)

(72) Inventors: Ariel Raviv, Haifa (IL); Irena Grabovitch-Zuyev, Nahariya (IL); Joel Oren, Tel Aviv (IL)

(73) Assignee: Yahoo Ad Tech LLC, New York, NY (US)

(*) Notice: Subject to any disclaimer, the term of this patent is extended or adjusted under 35 U.S.C. 154(b) by 6 days.

This patent is subject to a terminal disclaimer.

(21) Appl. No.: 18/642,436

(22) Filed: Apr. 22, 2024

(65) Prior Publication Data

US 2024/0273607 A1 Aug. 15, 2024

Related U.S. Application Data

(63) Continuation of application No. 18/102,793, filed on Jan. 30, 2023, now Pat. No. 11,966,963, which is a continuation of application No. 16/224,949, filed on Dec. 19, 2018, now Pat. No. 11,568,466.

(51) Int. Cl.
G06Q 30/00 (2023.01)
G06Q 30/0251 (2023.01)
G06Q 30/0601 (2023.01)
G06V 30/413 (2022.01)

(52) U.S. Cl.
CPC ..... G06Q 30/0631 (2013.01); G06Q 30/0255 (2013.01); G06Q 30/0603 (2013.01); G06V 30/413 (2022.01)

(58) Field of Classification Search
CPC ........... G06Q 30/0631; G06Q 30/0255; G06Q 30/0603; G06V 30/413
See application file for complete search history.

(56) References Cited

U.S. PATENT DOCUMENTS

2018/0101893 A1* 4/2018 Dagan ................ G06Q 30/0641
2018/0247360 A1* 8/2018 Baxter ............... G06Q 30/0635
2020/0065857 A1* 2/2020 Lagi ................... G06Q 30/0254

OTHER PUBLICATIONS

V. K. Seetharamu, S. Sathish, A. Kumar and K. Kumar, "A Generic Framework for Recommendations Based on User Data Aggregation," 2016 IEEE International Conference on Web Services (ICWS), 2016, pp. 617-622, doi: 10.1109/ICWS.2016.85. (Year: 2016).*

* cited by examiner

Primary Examiner — Anand Loharikar
(74) Attorney, Agent, or Firm — Cooper Legal Group LLC

(57) ABSTRACT

One or more computing devices, systems, and/or methods for generating and providing recommendations of products are provided. For example, content is extracted from a message sent to a user. The content is evaluated to identify a product identifier corresponding to a product title of a product. If the product identifier is a truncated version of the product title, then a database of product titles and frequencies of occurrence of the product titles is used to complete the product title. A model is used to infer a product category for the product title. Matching scores are assigned to products within a product category based upon weighted attributes. A recommendation is provided to the user for a product having a matching score greater than a matching threshold.

20 Claims, 8 Drawing Sheets

SYSTEMS AND METHODS FOR RECOMMENDATION GENERATION

RELATED APPLICATIONS

This application claims priority to and is a continuation of U.S. application Ser. No. 18/102,793, filed on Jan. 30, 2023, entitled "SYSTEMS AND METHODS FOR RECOMMENDATION GENERATION", which claims priority to and is a continuation of U.S. application Ser. No. 16/224,949, filed on Dec. 19, 2018, entitled "SYSTEMS AND METHODS FOR RECOMMENDATION GENERATION". U.S. application Ser. No. 18/102,793 and U.S. application Ser. No. 16/224,949 are incorporated by reference herein in their entirety.

BACKGROUND

Many users purchase products from product providers, such as items or services through websites, computer applications, retail stores, etc. Once a user has purchased a product from a product provider, the product provider may generate an electronic message, such as an email, comprise information relating to the purchase by the user of the product. The product provider may transmit the electronic message to an account of the user, such as to an email account of the user. In an example, the product provider may include recommendations of other products within the electronic message. The recommendations may be generated based upon what products the user viewed through a website of the product provider.

SUMMARY

In accordance with the present disclosure, one or more computing devices and/or methods for providing recommendations are provided. In an embodiment of providing a recommendation, content is extracted from a message of an account of a user, such as from an email of an email account of the user. For example, the email may correspond to a receipt for a product purchased by the user, a delivery notification relating to the product being shipped to the user, or other message from a product provider from which the user purchased the product such as a service or item. The content may comprise text of the email, features extracted from an image within the email, an attachment to the email, content linked to by a hyperlink within the email, etc.

The content is evaluated to identify a product identifier of a product. In an embodiment, the product identifier is a truncated version of a product title of the product (e.g., the product identifier may comprise 3 words followed by 3 dots used to replace other words of the product title). A database of product titles and frequencies of the product titles occurring within data sources (e.g., occurring within the email, other emails of the email account or other email accounts, a product catalog, crawled data from websites, and/or other data sources) is searched to identify one or more product titles corresponding to the product identifier. For example, a product title is identified based upon a probability that the product title is a suffix of the product identifier. A target product title is selected from the one or more product titles as the product title of the product based upon a frequency of the target product title exceeding a threshold (e.g., having a highest frequency of occurrence within the data sources). A product category, age category, gender category, and/or other categories for the product title are inferred using a model trained using a hierarchical taxonomy of product categories and product titles.

A product catalog of products available from a product provider may be processed for matching against the target product title and categories determined for the product title such as a product category of the product. In an embodiment, product categories for products without product categories within the product catalog are inferred using the model. Partial product titles of products within the product catalog are completed using the database of product titles and frequencies. The product catalog is normalized by removing redundant terms in product information within the product catalog. The product catalog may be indexed based upon categories, brands, product titles, and/or product descriptions.

Matching scores are assigned to products within the product catalog using weighted attributes corresponding to categories, brands, product titles, and/or product descriptions. The matching scores correspond to probabilities that products within the product catalog match the product title (e.g., are similar to or related to the product mentioned within the email). A product having a matching score greater than a matching threshold (e.g., a highest matching score and a matching score above a threshold) is used to generate a recommendation for the product. The recommendation is transmitted over a computer network to a device associated with the user. The recommendation may be displayed through a user interface of the device, played as an audio message by the device, etc.

Recommendations may be generated by processing a plurality of emails of the email account, emails of a plurality of email accounts, emails from multiple different product providers, product catalogs of various product providers, etc. In this way, recommendations of products available from one product provider can be generated based upon emails from other product providers.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
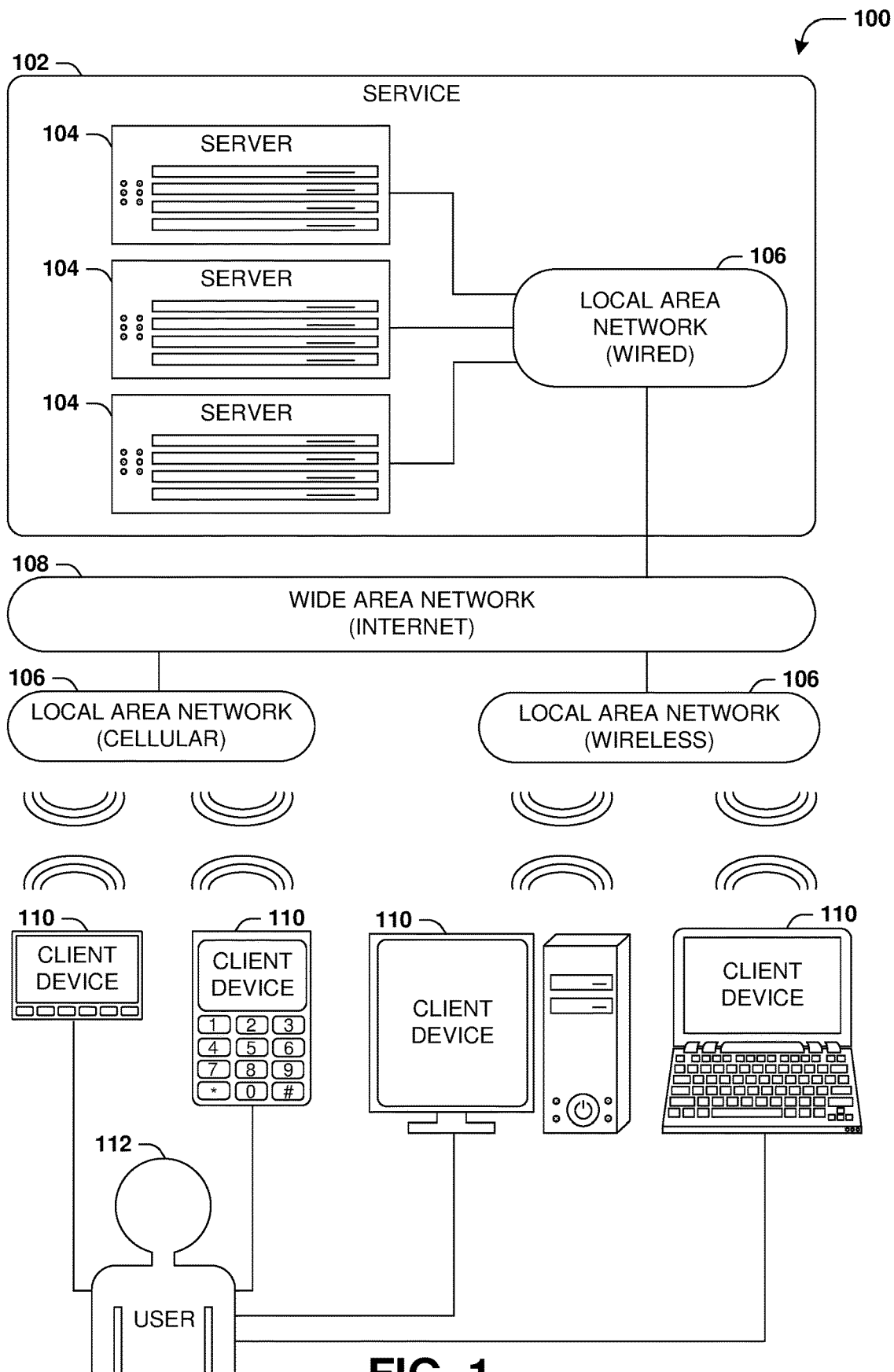
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
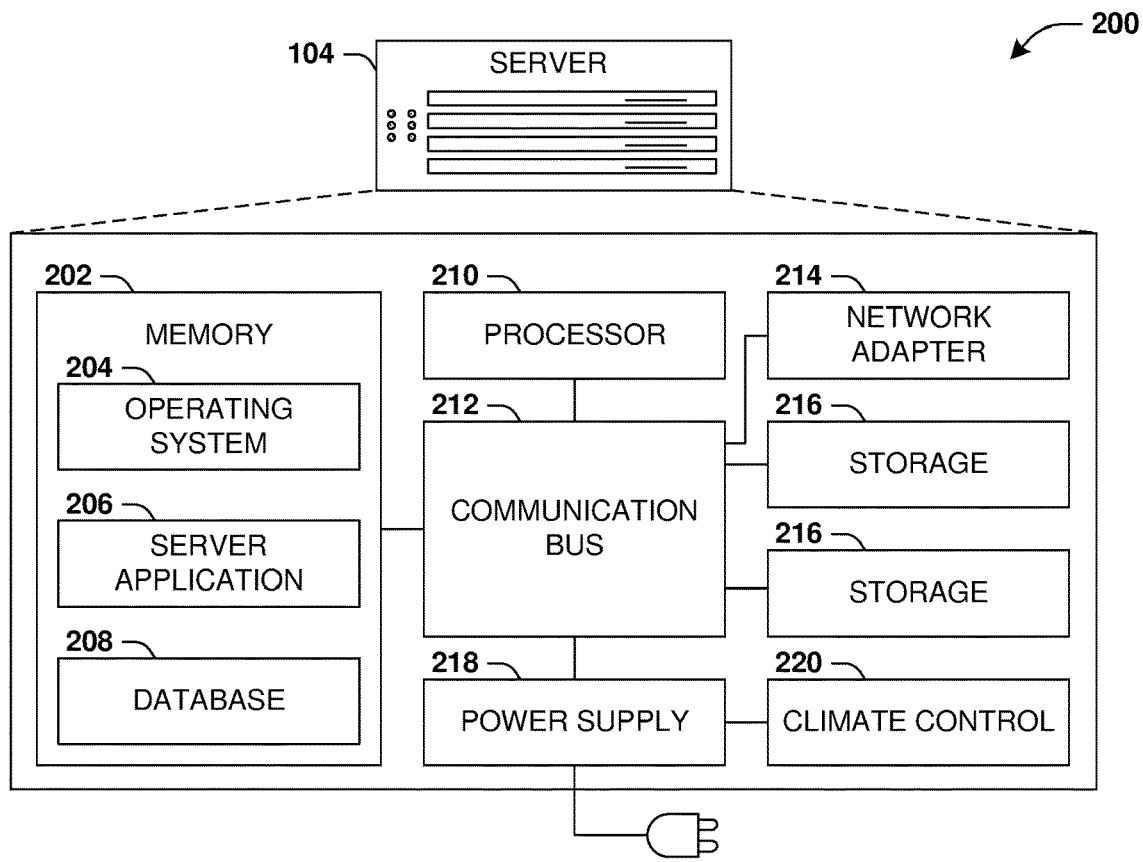
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
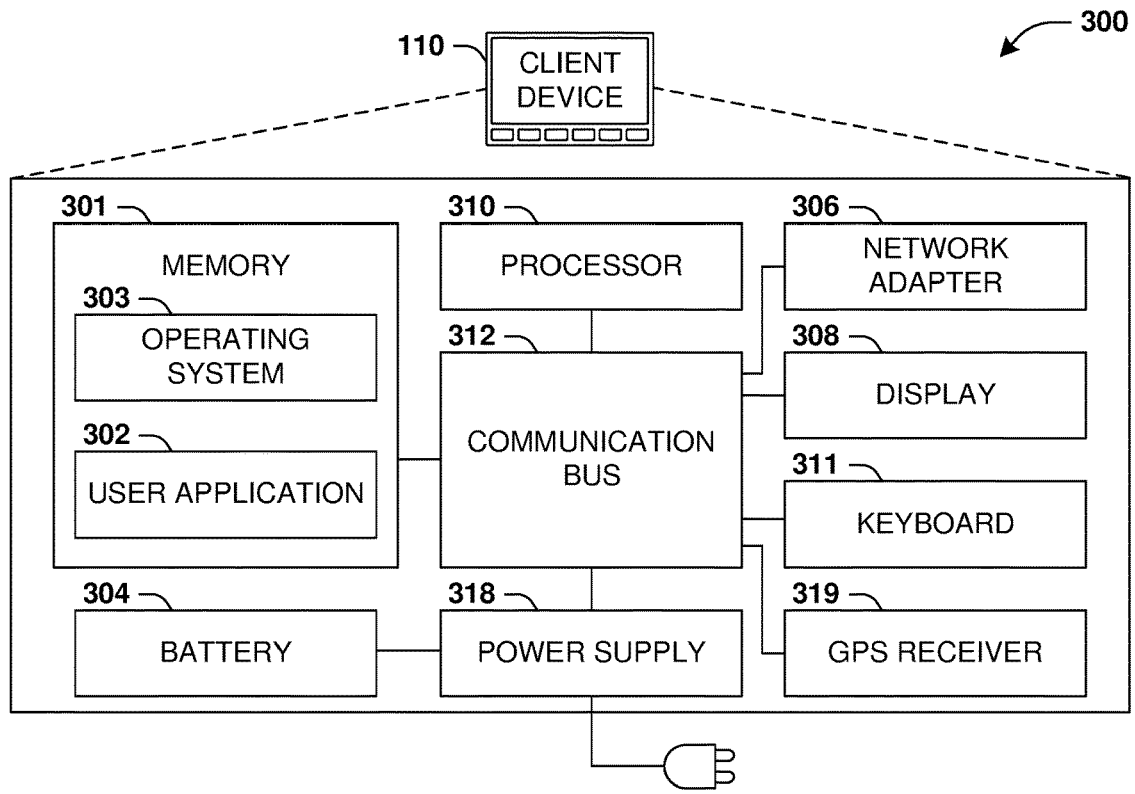
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for generating and providing recommendations are provided. Conventional technical processes for generating and transmitting recommendations to remote devices relate to retargeting where a product provider provides recommendations to a user based upon the user's interactions with products through a website or application of the product provider. For example, while the user is browsing a car dealership website, the user may view a red car. After, the car dealership may create a recommendation of purchasing the red car based upon the user viewing the red car through the car dealership website. If the car dealership knows an email address of the user, then the car dealership may send an email to the user about the recommendation of the red car. In particular, retargeting only takes into account user interactions with products of that same product provider through a website of the product provider. For example, the email recommendation of the red car does not take into account cars that the user viewed through other websites. Unfortunately, this conventional technical process has limited user reach because it is limited to users that have previously visited a retailer's website. Other conventional technical processes may utilize limited amounts or types of information when creating recommendations. Thus, computer resources and network bandwidth can be wasted in generating, storing, and transmitting recommendations to users that are not relevant or are uninteresting because misleading information is used or there is a lack of information.

Accordingly, as provided herein, more accurate and relevant recommendations are generating and transmitted to devices of users so that computing resources and network bandwidth are not wasted in generating, storing, and transmitting irrelevant and/or uninteresting recommendations. The present system improves upon existing technical solutions because any type of user (e.g., a new users or an existing user) can be targeted and information from multiple retailers can be aggregated to improve user reach. More relevant recommendations are generated by using message content, such as email content, to identify products to recommend to users. This allows for cross product provider recommendation generation because email content from one product provider can be used to recommend products of another product provider. For example, the user may receive a delivery notification from a clothing retailer for a shirt. This information can be used to identify similar shirts to recommend to the user from other retailers. In this way, emails from a user account of a user (e.g., emails received within a past 30 days or any other timeframe), emails from a plurality of user accounts, product catalogs of product providers (e.g., products that the clothing retailer would like to display to users through websites, applications, or other content mediums), user profile data (e.g., age, gender, location, etc.), user browsing history, user interaction with content (e.g., a user liking a post about a particular purse), user purchase history from various product providers, and/or other data is aggregated to identify products to recommend to the user.

Figure 4:
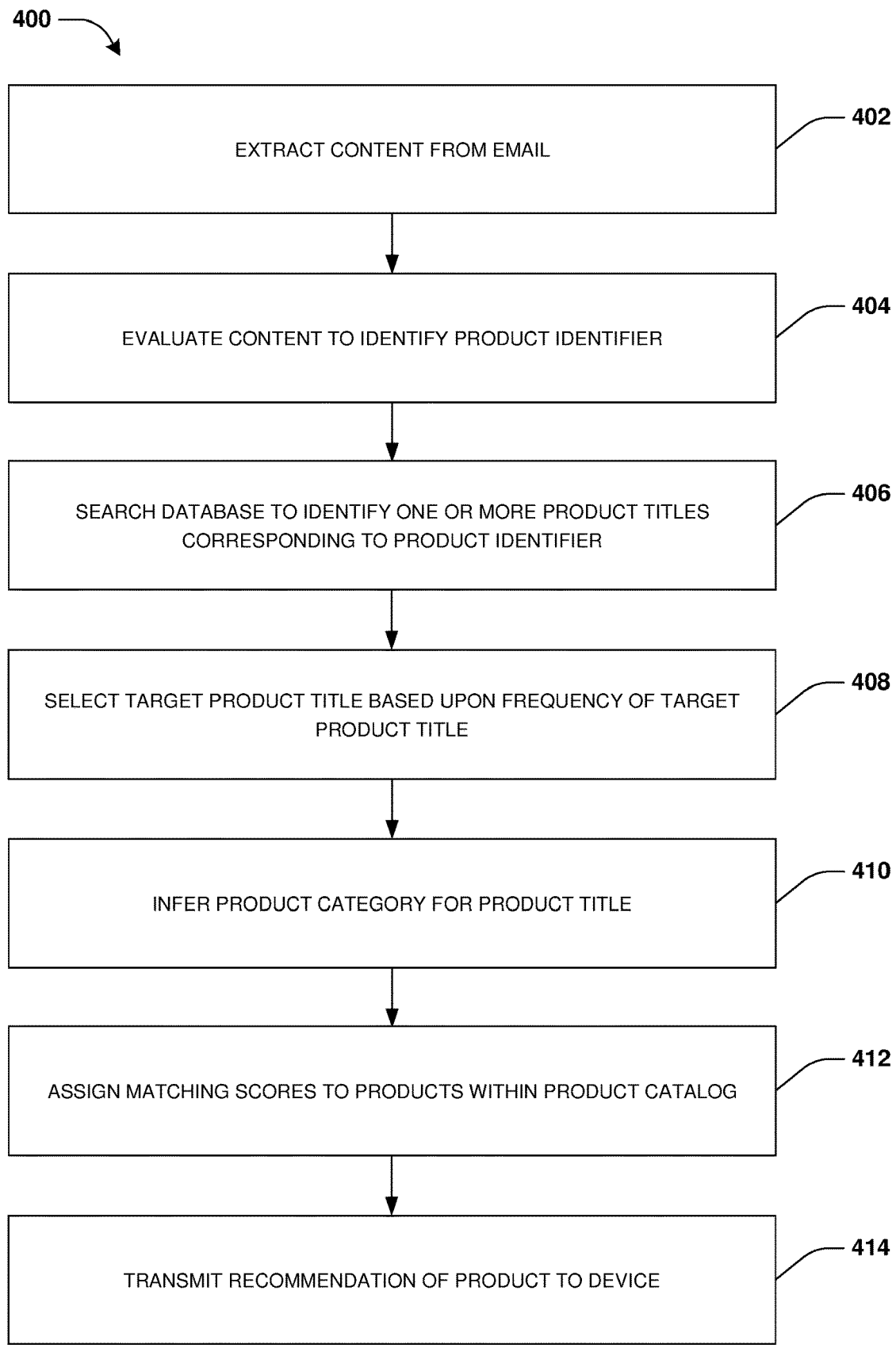
FIG. 4 is a flow chart illustrating an example method for generating and transmitting recommendations.
Figure 5A:
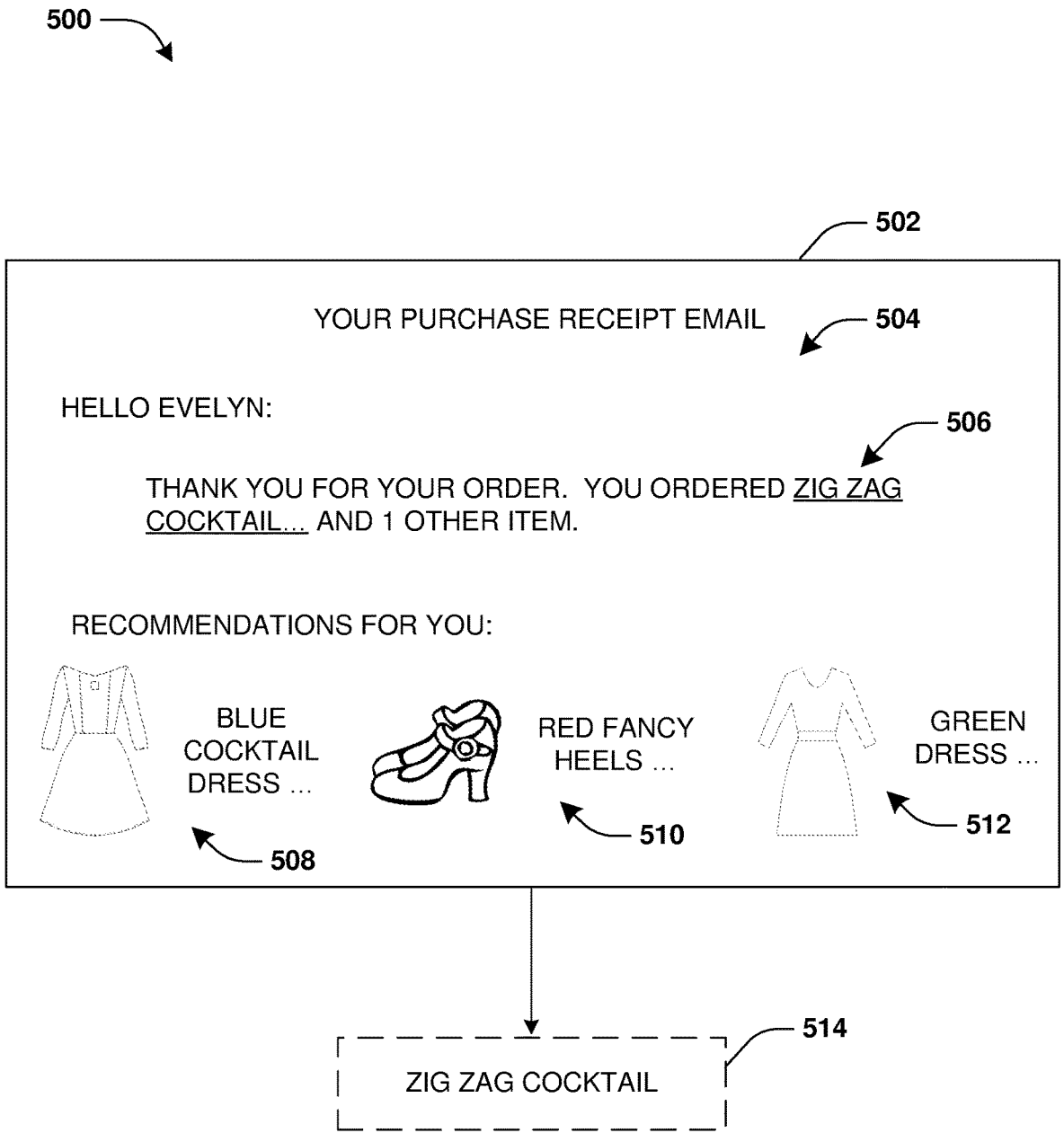
FIG. 5A is a component block diagram illustrating an example system for generating and transmitting recommendations, where an email is processed.

An embodiment of generating recommendations is illustrated by an example method 400 of FIG. 4, which is described in conjunction with FIGS. 5A-5D. A user may maintain an account with a messaging service, such as an email account with an email service, a text messaging account, a social network account, etc. The user may access the account through a device 502, such as a laptop, smart phone, wearable device, etc., as illustrated by FIG. 5A. The user may access messages relating to products of interest to the user, such as purchase receipts of purchased products, delivery notifications of products being shipped to the user, recommendations of products, etc. For example, the user may receive an email 504 corresponding to a purchase receipt from a clothing retailer for a Zig Zag Cocktail Dress. At 402, content 506 is extracted from the email 504 of the email account of the user. The content 506 may comprise text, content within an attachment, an image, a hyperlink, content linked to by the hyperlink, and/or other types of data. At 404, the content 506 is evaluated to identify a product identifier 514 of a product. For example, the text "Zig Zag Cocktail" is extracted as the product identifier 514. Text recognition, image recognition, feature extraction and classification, and/or other techniques may be used to identify the product identifier 514.

Figure 5B:
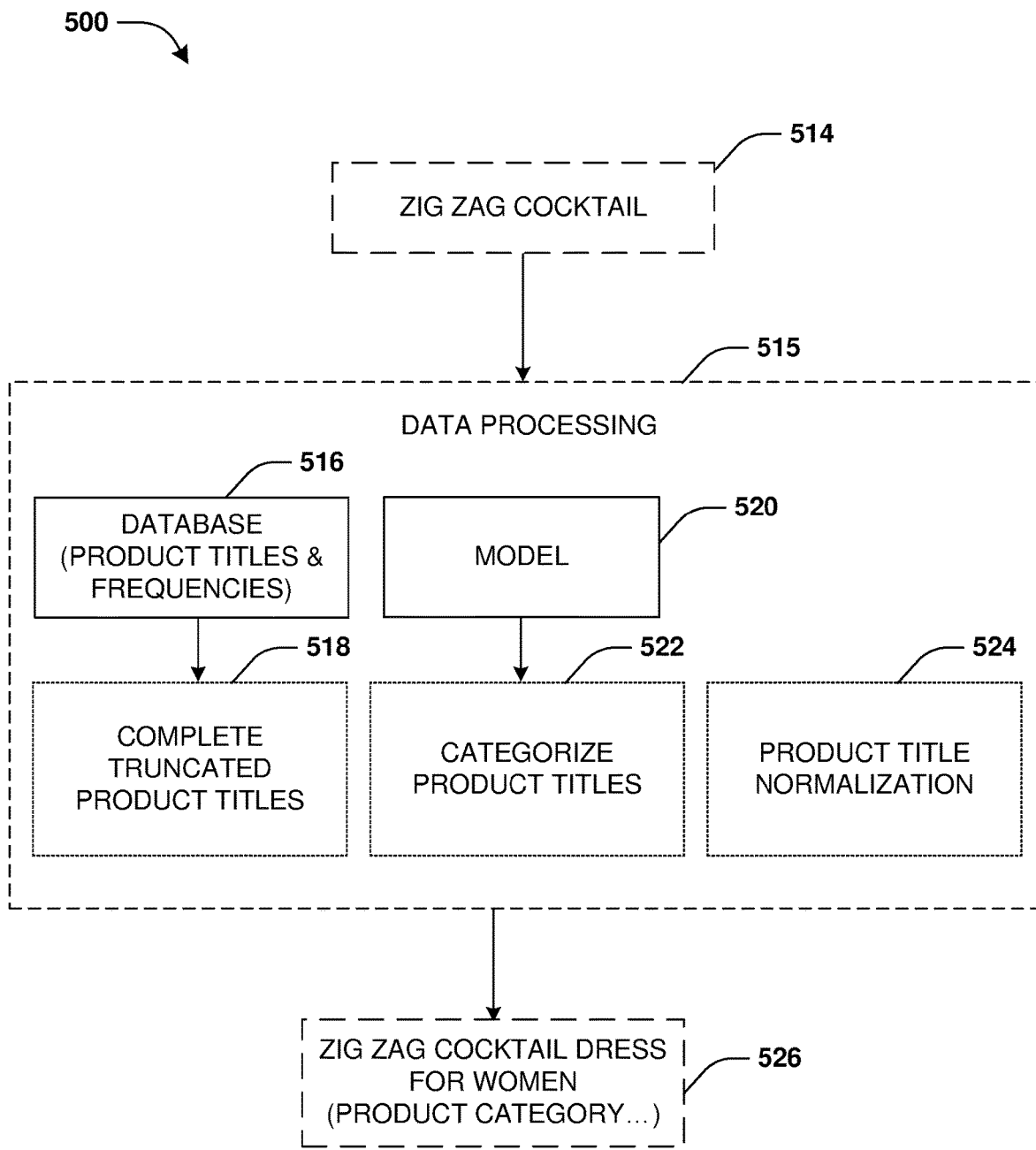
FIG. 5B is a component block diagram illustrating an example system for generating and transmitting recommendations, where email data is processed.

The product identifier 514 and/or other extracted content of the email 504 is processed 515, as illustrated by FIG. 5B. In an embodiment, the product identifier 514 may be determined to be a truncated version of a full product title "Zig Zag Cocktail Dress for Women" of the product. Accordingly, a database 516 of product titles and frequencies of the product titles occurring within various data sources (e.g., within crawl website data, within product catalogs of products available from product providers, within emails such as a first product suggestion 508, a second product suggestion 510, and a third product suggestion 512 within the email 504, and/or other data sources) is used to complete 518 the truncated version of the full product title. In an embodiment, a data source comprises the email 504, and thus the truncated product title may be completed based upon text and/or image features extracted from the first product suggestion 508, the second product suggestion 510, the third product suggestion 512, and/or other content within the email 504.

The database 516 is searched to identify one or more product titles corresponding to the product identifier 514 "Zig Zag Cocktail" extracted from the email 504, at 406. A product title is identified as corresponding to the product identifier 514 for identification as the one or more product titles based upon the product title having a probability greater than a threshold that the product identifier 514 is a prefix for the product title (or that the product title is a suffix for the product identifier 514). This is because the product identifier 514 is a truncated version of the full product title (e.g., the remaining words of the full product title were replaced with the 3 dots), and thus the product identifier 514 may comprise the first few words of the full product title. For example, the product identifier 514 "Zig Zag Cocktail" is a prefix for a product title "Zig Zag Cocktail Dress for Women", a product title "Zig Zag Cocktail glass", etc. Other information may be used to help determine which product title is more relevant than other product titles (e.g., other content within the email 504, such as "blue cocktail dress", "red fancy heels", "green dress", etc. may match the product title "Zig Zag Cocktail Dress for Women" more than the product title "Zig Zag Cocktail glass").

In an embodiment, weights are applied to product titles within the database 516 based upon user information of the user. For example, a product title may be weighted more than other product titles based upon the product title corresponding to a product that the user mentioned in a social network post, an email, a calendar entry, and/or other user information. The weights may be applied to product titles within the database 516 based upon a user browsing history. For example, a product title of a product may be weighted more than other product titles based upon the user browsing content and visiting websites that mention the product or similar products. The weights may be applied to product titles within the database 516 based upon a user purchase history. For example, a product title of a product may be weighted more than other product titles based upon the user purchasing the product or a similar product.

A target product title 526 such as "Zig Zag Cocktail Dress for Women" is selected from the one or more product titles based upon a frequency of the target product title 526 "Zig Zag Cocktail Dress for Women" exceeding a threshold (e.g., a most frequently occurring product title of the one or more product titles), at 408. At 410, a product category is inferred for the target product title 526 "Zig Zag Cocktail Dress for Women" using a model 520 trained using a hierarchical taxonomy of product categories and product titles. The model 520 may be trained to identify product categories for product titles using the hierarchical taxonomy, the database 516, crawled website data, product catalogs (e.g., products within a product catalog may already be labeled with product categories), and/or labeled product data where product titles are already assigned product categories. In this way, given an input of a product title, a category for the product title can be inferred by the model 520, such as by using a word-embedding based model or any other type of model.

The model 520 can also be used to infer an age category (e.g., children ages 3-10 toys, teenage boy shoes, etc.), a gender category, or other types of categories. For example, the model 520 may determine that the text "Cocktail Dress for Women" of the target product title 526 "Zig Zag Cocktail Dress for Women" relates to a women's dress product category. In this way, the model 520 is used to categorize 522 product titles for improved matching so that the target product title 526 "Zig Zag Cocktail Dress for Women" is matched to similar types of products (e.g., women's dresses as opposed to cocktail glasses).

In an embodiment, the target product title 526 "Zig Zag Cocktail Dress for Women" is normalized 524. Normalization 524 is performed to change case (e.g., change all case to lower case), remove non-alphanumeric characters, remove multiple sequential spaces, etc.

In an embodiment, the data processing 515 is used to process an aggregation of extracted data from messages received by the user over a particular time period, such as a past 20 days. In this way, multiple categorized product titles can be identified as being relevant and interesting to the user for recommendation generation.

Figure 5C:
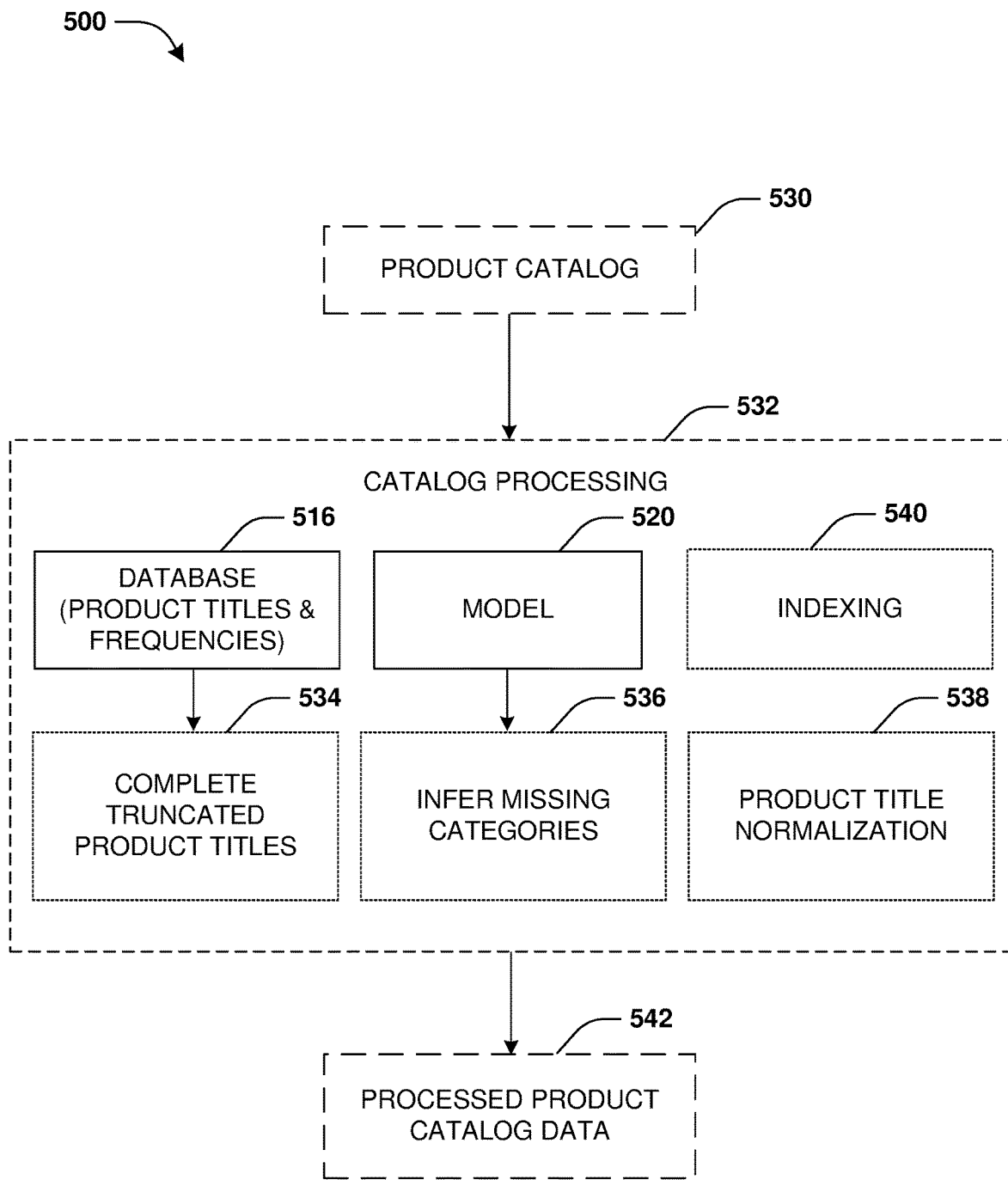
FIG. 5C is a component block diagram illustrating an example system for generating and transmitting recommendations, where a product catalog is processed.

The target product title 526 "Zig Zag Cocktail Dress for Women", along with the inferred categories such as the women's dress product category and a female gender category, are matched to product items within one or more product catalogs of product providers to generate recommendations of such product items for the user. Before matching, a product catalog 530 may be processed 532, as illustrated by FIG. 5C. For example, the product catalog 530 and/or other product catalogs can varying in quality and detail so missing details such as product titles, categories, and/or other data is inferred, modified, and/or normalized during processing 532. In an embodiment of processing 532 the product catalog 530, the database 516 of product titles and frequencies of the product titles occurring within data sources is used to complete 534 any truncated or partial product titles within the product catalog 530.

In an embodiment of processing 532 the product catalog 530, the model 520 is used to infer 536 missing categories for products within the product catalog 530. The model 520 is used to infer 536 product categories for products, age categories for products, gender categories for products, and/or categories. The model 520 may evaluate product titles, product images, product descriptions, product pricing, product categories, and/or other information within the product catalog 530 to infer 536 the missing categories within the product catalog 530.

In an embodiment of processing 532 the product catalog 530, product information within the product catalog 530 and/or inferred information (e.g., product titles, descriptions, etc.) are normalized 538. Normalization 538 may remove redundant artifacts such as redundant terms within product information of the product catalog 530. Normalization 538 is performed because a product provider may make redundant use of terms within the product catalog 530 for products in the hopes of increasing odds of products appear in results of search engines. However, this can negatively affect the ability to match the target product title 526 "Zig Zag Cocktail Dress for Women" and categories to products within the product catalog 530. Thus, normalization 538 is performed.

In an embodiment of processing 532 the product catalog 530, the product catalog 530 is indexed 540 for matching. The product catalog 530 may be indexed 540 based upon categories of products, such as product categories, age categories, gender categories, and/or other categories explicitly specified by the product catalog 530 or inferred. The product catalog 530 may be indexed 540 based upon brands of products, such as brands explicitly specified by the product catalog 530 or inferred. The product catalog 530 may be indexed 540 based upon product titles of products, such as product titles explicitly specified by the product catalog 530 or inferred. The product catalog 530 may be indexed 540 based upon product descriptions of products, such as product descriptions explicitly specified by the product catalog 530 or inferred.

Figure 5D:
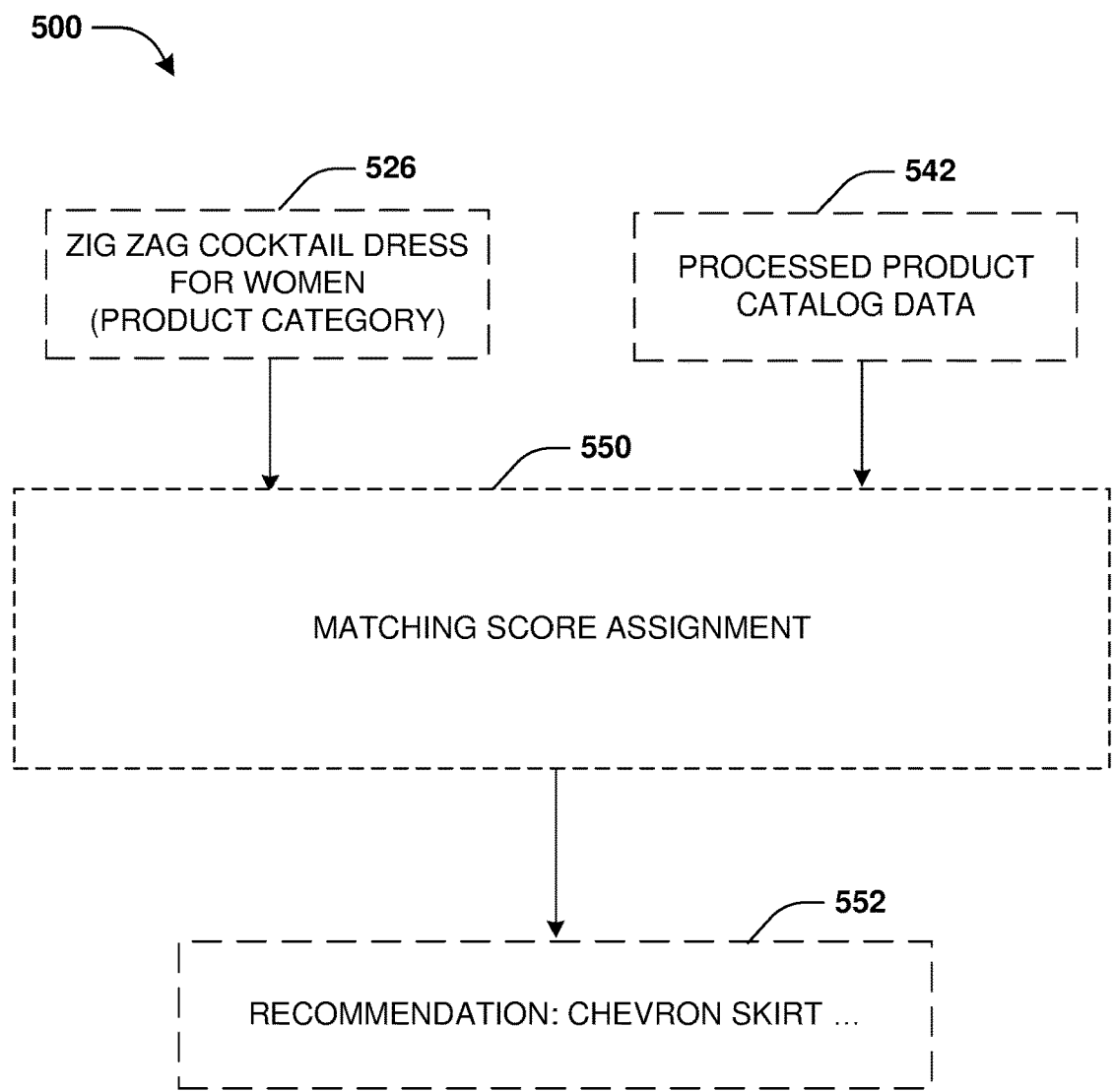
FIG. 5D is a component block diagram illustrating an example system for generating and transmitting recommendations, where a recommendation is generated.

In this way, the product catalog 530 and/or other product catalogs are processed 532 to create processed product catalog data 542 used for a matching process to identify products to recommend to the user. At 412, matching scores are assigned 550 to products within the processed product catalog data 542, as illustrated by FIG. 5D. The matching scores are assigned 550 using weighted attributes. In an embodiment, the weighted attributes correspond to categories (e.g., a product category, an age category, a gender category, etc.), brands, product titles, product descriptions, product prices, and/or other product information that can be matched between the processed product catalog data 542 and the target product title 526 "Zig Zag Cocktail Dress for Women" and categories thereof (e.g., the product category of women's dresses, the gender category of women, etc.).

A matching score corresponds to a probability that a product within the processed product catalog data 542 matches the target product title 526 "Zig Zag Cocktail Dress for Women." A degree of matching may correspond to whether a product within the processed product catalog data 542 is similar (e.g., a similar type of product, such as a woman's dress, a cocktail dress, an article of clothing such as a shirt or scarf with a zig zag pattern, etc.) in product type, shape, color, brand, price, etc. That is, a match does not necessarily mean the same product because the user may have already purchased the product (e.g., the email 504 was a receipt for the Zig Zag Cocktail Dress for Women), and thus a match can be determined based upon a product being a similar type of product, shape, color, brand, price, etc.

In an embodiment, weights of the weighted attributes are modified based upon user interaction with content associated with products within the processed product catalog data 542 (within the product catalog 530). For example, the user may have clicked on a product description of a product while browsing a website, and thus a weight for the product may be increased. The user interaction may correspond to a variety of interactions, such as viewing a product, creating a social network post about a product, capturing a photo of a product, creating a calendar entry about a product (e.g., a task to buy a dress for party next week), saving or liking a product, placing a product into a cart of a shopping website, etc.

In an embodiment, matching scores may be assigned 550 based upon recency and frequency of the product occurring within email data, catalog data, or crawled website data. The more recently information about a product is generated and/or viewed, a relatively larger matching score is assigned 550 for the product. The more frequently information about a product is generated and/or viewed, a relatively larger matching score is assigned 550 for the product.

Once the matching scores have been assigned 550 to products within the processed product catalog data 542 (products within the product catalog 530), one or more products are selected from the product catalog 530. The one or more products are selected based upon products having matching scores above a matching threshold and/or based upon products having largest matching scores. In an example, a chevron skirt product is selected from the product catalog 530 based upon the chevron skirt product having a largest matching score and a matching score great than the matching threshold.

At 414, a recommendation 552 of the chevron skirt product is generated. The recommendation 552 may be generated as an email, an image, an audio message, a user interface element, or any other data that can be provided to the user through a device, such as a mobile device, a laptop, a wearable device, a smart speaker, a television, etc. In this way, the recommendation 552 is transmitted to the device, such as over a computer network, for display or playback to the user through the device.

Figure 6:
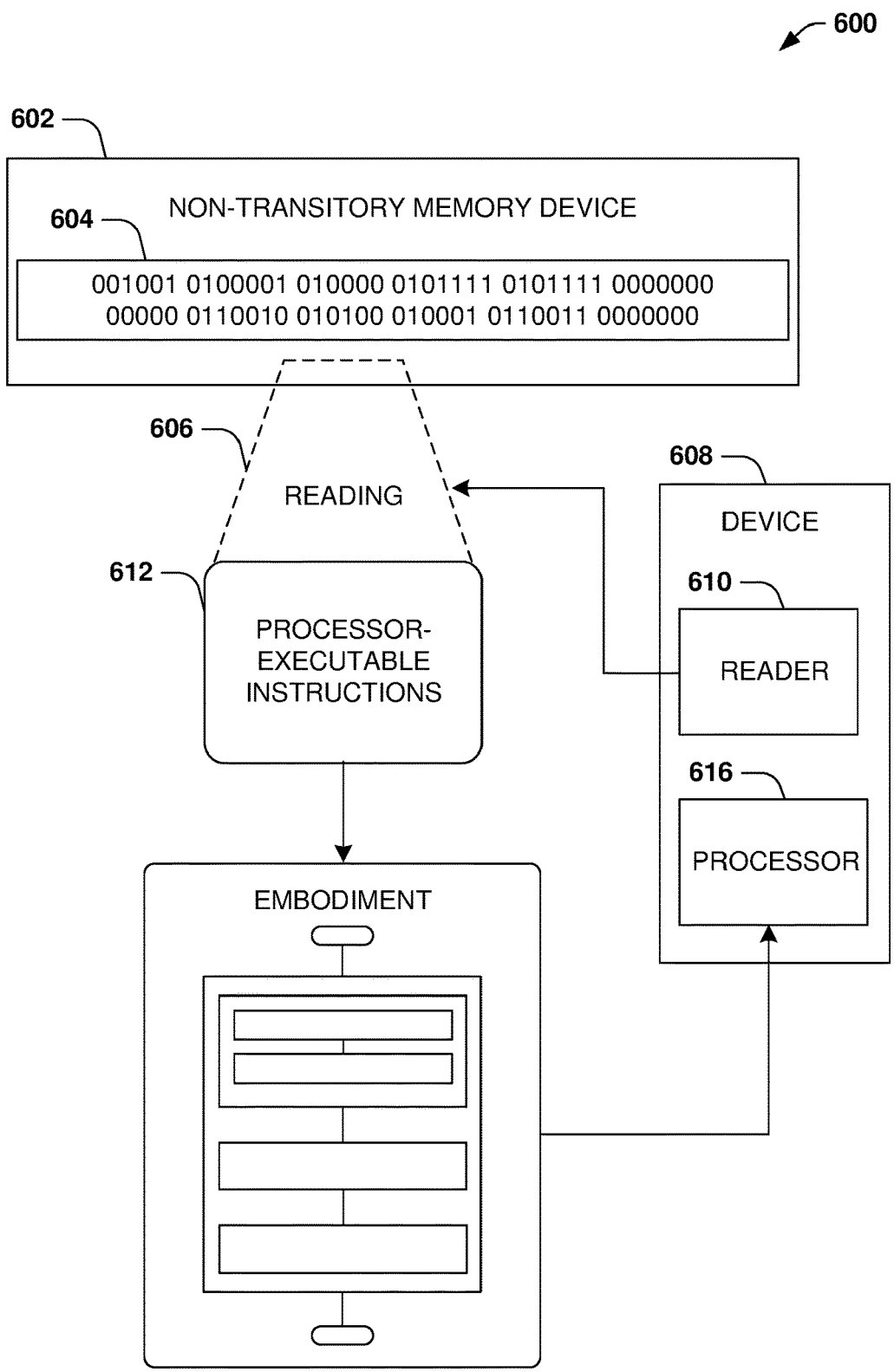
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIGS. 5A-5D, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computing device comprising:
a processor; and
memory comprising processor-executable instructions that when executed by the processor cause performance of operations, the operations comprising:
extracting content from an email of an email account of a user;
evaluating the content to identify a product identifier as a product title of a product;
training a model using a hierarchical taxonomy of product categories and product titles;
inferring a product category for the product title identified for the product using the model trained using the hierarchical taxonomy of product categories and product titles;
assigning matching scores to products within a product catalog using weighted attributes corresponding to at least one of categories, brands, product titles, and product descriptions, wherein the matching scores correspond to probabilities that products within the product catalog match the product title; and
transmitting a recommendation of a product having a matching score greater a matching threshold over a computing network to a device associated with the user.

2. The computing device of claim 1, wherein the operations comprise:
training the model using at least one of a database, crawled website data, one or more product catalogs or labeled product data.

3. The computing device of claim 1, wherein the operations comprise:
aggregating email data of the email account over a time period, wherein the email data corresponds to emails from a plurality of product providers.

4. The computing device of claim 3, wherein the operations comprise:
matching product categories of product titles occurring within the email data to products within the catalog for creating recommendations.

5. The computing device of claim 4, wherein the operations comprise:
aggregating the email data to track frequency and recency of product titles occurring within the email data.

6. The computing device of claim 5, wherein the operations comprise:
utilizing the frequency and recency for assigning matching scores to products within the product catalog.

7. The computing device of claim 4, wherein the operations comprise:
aggregating the email data to track at least one of frequency or recency of product titles occurring within the email data.

8. The computing device of claim 7, wherein the operations comprise:
utilizing at least one of the frequency or the recency for assigning matching scores to products within the product catalog.

9. A non-transitory machine readable medium having stored thereon processor-executable instructions that when executed cause performance of operations, the operations comprising:
extracting content from messages of an account of a user;
evaluating the content to identify a product identifier as a product title of a product;
identifying a product category for the product title identified for the product;
assigning matching scores to products within a product catalog using weighted attributes corresponding to at least one of categories, brands, product titles, and product descriptions, wherein the matching scores correspond to probabilities that products within the product catalog match the product title; and
generating a recommendation of a product having a matching score above a matching threshold.

10. The non-transitory machine readable medium of claim 9, wherein the operations comprise:
assigning the matching scores based upon a recency of the product occurring within at least one of email data, catalog data, or crawled data.

11. The non-transitory machine readable medium of claim 10, wherein the recency corresponds to the product occurring within email data.

12. The non-transitory machine readable medium of claim 10, wherein the recency corresponds to the product occurring within catalog data.

13. The non-transitory machine readable medium of claim 10, wherein the recency corresponds to the product occurring within crawled data.

14. The non-transitory machine readable medium of claim 9, wherein the operations comprise:
assigning the matching scores based upon a frequency of the product.

15. The non-transitory machine readable medium of claim 14, wherein the frequency corresponds to the product occurring within email data.

16. The non-transitory machine readable medium of claim 14, wherein the frequency corresponds to the product occurring within catalog data.

17. The non-transitory machine readable medium of claim 14, wherein the frequency corresponds to the product occurring within crawled data.

18. A method, comprising:
executing, on a processor of a computing device, instructions that cause the computing device to perform operations, the operations comprising:
extracting content from an email of an email account of a user;
evaluating the content to identify a product identifier as a product title of a product;
training a model using a hierarchical taxonomy of product categories and product titles;
inferring a product category for the product title identified for the product using the model trained using the hierarchical taxonomy of product categories and product titles;
assigning matching scores to products within a product catalog using weighted attributes corresponding to at least one of categories, brands, product titles, and product descriptions, wherein the matching scores correspond to probabilities that products within the product catalog match the product title; and transmitting a recommendation of a product having a matching score greater a matching threshold over a computing network to a device associated with the user.

19. The method of claim 18, comprising:

modifying weights for the weighted attributes based upon user interaction data of content associated with products within the product catalog.

20. The method of claim 18, comprising:

aggregating email data of the email account over a time period, wherein the email data corresponds to emails from a plurality of product providers.

* * * * *